United States Patent

[11] 3,576,982

[72] Inventor Keith A. Duke
Wappingers Falls, N.Y.

[21] Appl. No. 783,925

[22] Filed Dec. 16, 1968

[45] Patented May 4, 1971

[73] Assignee International Business Machines Corporation
Armonk, N.Y.

[54] ERROR TOLERANT READ-ONLY STORAGE SYSTEM

9 Claims, 2 Drawing Figs.

[52] U.S. Cl. .......... 235/153, 340/172.5

[51] Int. Cl. .......... G11c 29/00, G06f 11/00

[50] Field of Search .......... 340/146.1, 172.5; 235/153

[56] References Cited

UNITED STATES PATENTS

| | | | |
|---|---|---|---|
| 3,312,947 | 4/1967 | Raspanti .......... | 340/172.5 |
| 3,411,137 | 11/1968 | Howells, et al. .......... | 340/146.1X |
| 3,421,148 | 1/1969 | Howells, et al. .......... | 340/146.1X |

*Primary Examiner*—Malcolm A. Morrison
*Assistant Examiner*—Charles E. Atkinson
*Attorneys*—Hanifin and Jancin and Roy R. Schlemmer, Jr

ABSTRACT: A read-only storage system wherein each data word is stored twice, once in its true form and once in its complement form. Said two data words are further stored at complementary addresses and means are provided upon readout of any data word for detecting a system error. Said means being further operative to automatically access an address complementary to the one currently being utilized for reading out the same data word in the complementary form at said complementary address.

INVENTOR
KEITH A. DUKE

BY [signature]
ATTORNEY

ERROR TOLERANT READ-ONLY STORAGE SYSTEM

BACKGROUND OF THE INVENTION

Error detection and correction have long been a primary problem facing computer system designers and manufacturers. With modern day computers the complexity of the computer and thus the total number of circuits employed has increased by several orders of magnitude over just a decade ago. The possible locations in which errors can occur have thus also increased by several orders of magnitude. While it is difficult to say that there is one portion of a computer where errors may be tolerated more readily than others, the usual logical circuitry sections, which are built up of modularized hardware components, can be fairly easily replaced once defective operation is detected. However, in the memory area, it is usually quite difficult to replace bad sections of memory due to the complicated three-dimensional characteristics of such memories. Thus it is usually necessary to achieve some sort of error tolerant operations or completely replace the memory if the need arises.

A number of systems or procedures have been utilized in the past for overcoming failures in read-write memories by introducing spare sections of storage which can be utilized if a given section fails. This has even been extended to the extreme of replacing entire bit planes. Ordinarily, however, given memory words or complete word sections of the memory will be found to be defective. The addresses of these words will be blocked out and automatic indexing mechanisms utilized to access a spare section. This however implies recreating data which was originally in the failed section and writing it into the spare section. This type of operation is not possible in a read-only store type of memory since such memories are factory wired, that is, the data therein is "written in" as a result of factory fabrication. Thus once a read-only store is installed in a machine, its memory content is fixed. In prior machines where it has been desired to maintain higher reliability than is possible with a single read-only store, system designers have resorted to complete duplication of the read-only store and all of its hardware including the addressing mechanism and the output sense amplifiers latches, etc.

Accordingly, there is a great need in the computer industry for various techniques for improving the reliability of operation of such read-only stores which are often utilized in critical control sections of a computing system and any failure of the read-only store will disable the entire machine. Also, since such read-only stores operate strictly under machine control any means for improving the reliability of operation must be automatic in operation and not require any external operator or programmer intervention.

SUMMARY OF INVENTION AND OBJECTS

It has not been found that considerable improvement in reliability of read-only storage modules may be achieved with a minimal increase in hardware cost by storing every data word in said memory in both its true and complement form. According to a further aspect, the complement form of data word is stored at a location in memory directly ascertainable from the address of the data word stored in its true form. Preferably the relationship between these two storage locations is that the complementary data word is stored at the complementary address relative to the address of the true data word. Control means are additionally provided to automatically utilize the data storage format of the read-only store so that when an error is detected on read-out of data from the store the controls will automatically access the complementary word stored at the complementary address.

It is accordingly a primary object of the present invention to provide a read-only storage module having increased reliability.

It is a further object of the invention to provide such a read-only storage module wherein the improved reliability is achieved with a minimum of additional hardware.

It is yet another object of the present invention to provide such a read-only storage system wherein data words are stored therein in both true and complement format.

It is another object of this invention to store such data words at a true and complement address respectively.

It is still another object of the invention to provide such a read-only storage system including control means for utilizing true and complement data storage formats to achieve the desired reliability of operation.

The foregoing and other objects, features and advantages of the invention will be apparent from the more particular description of a preferred embodiment of the invention as illustrated in the accompanying drawings.

DESCRIPTION OF THE PREFERRED EMBODIMENT

The objects of the present invention are accomplished in general by a method of storing data in a read-only storage memory, such that each data word is stored in its true and complement form, the true data word being stored at a first address and the complement data word being stored at a complement of said first address. Control means are provided for determining if an error exists and a data word read out from the memory and for automatically accessing the memory at the complementary address of the address just accessed.

Further means are provided for indicating whether a given data word accessed from the memory is in its true or complement form. Additional control means are provided whereby the address of the next data word in the read-only store in a particular instruction sequence may be accessed utilizing a complementary address directly as obtained from a complementary data word.

It will thus be apparent that the system may proceed with operation in either the true or complementary mode without significant control interruption especially insofar as inverting the address of the next member of an instruction stream is concerned, since the complementary address will automatically direct the memory controls to the complementary data word desired and as will be explained subsequently more fully, this data in its complementary form will always carry an indication that it is in its complement form either explicitly or implicitly.

Figure 1:
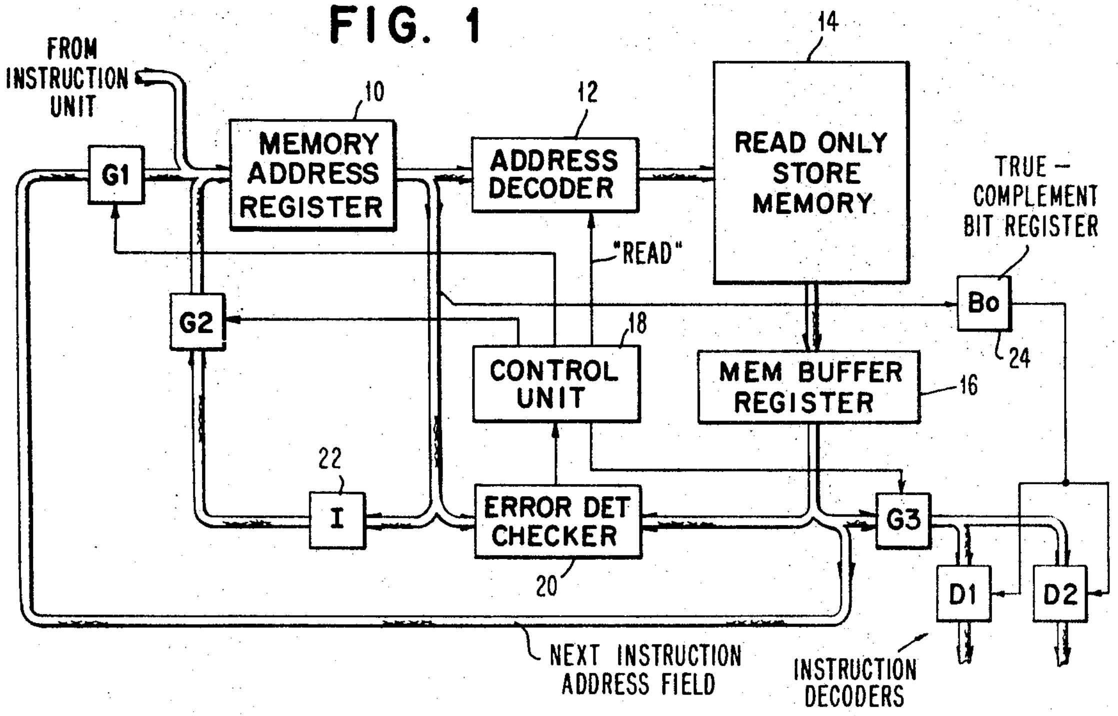
FIG. 1 is a functional block diagram of a Read-Only Storage Memory System embodying the principles of the present invention.

Referring now more specifically to FIG. 1, the overall operation of the invention will be set forth. It should first be understood that for the present system, as disclosed in FIG. 1, to function, the data content must be factory wired into the read-only storage memory such that it appears in two forms, its true form and its complement form and said data is stored at a first address and an address complementary thereto respectively. According to the preferred embodiment of the invention, the data must also carry a parity bit which is the parity of the actual address of the word in memory as would be stored in the Memory Address Register and of the data word itself. Also, a separate Complement Bit could be provided, however, this should rarely be necessary since if addresses are properly chosen, the highest order address field of the data word address which is in the Memory Address Register may be utilized to designate whether a word is in its true or complement form.

In the preferred embodiment of the invention, the system comprises a Memory Address Register 10, an Address Decoder 12 and the Read-Only Store Memory Matrix 14 in which every word is stored twice, once in true and once in complement form. As stated previously, the addresses of the complementary words are themselves chosen to be complementary. As stated previously, address allocation is most easily accomplished by selecting one address bit, for example, the most significant bit to be a binary 0 for all true words and a binary 1 for all complement words. Thus, this bit may be interrogated on each read cycle to see if a true or complement word is being currently accessed. Data read out from the read-only store memory 14 is loaded into the Memory Buffer Register 16.

Figure 2:
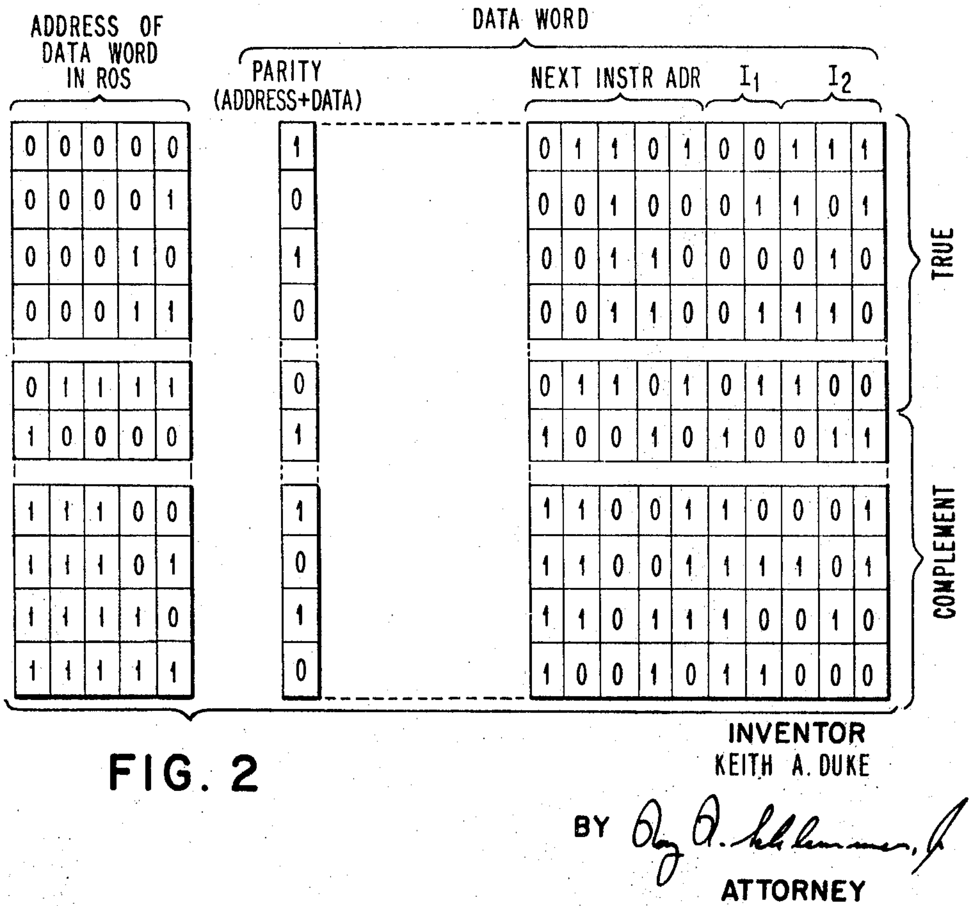
FIG. 2 comprises a diagrammatic illustration of the structure of the data words as utilized in the read-only store memory system of the present invention.

An exemplary data word format suitable for use with the present invention is shown in FIG. 2. The left hand section indicated as the Address of Data Word in ROS constitutes the actual address in the read-only store of the associated data word. It is the binary content of this address plus the data word which is utilized in determining the parity bit carried with a particular data word. Shown in the FIG. also is a complement bit which may be alternatively accessed in the Memory Buffer Register 16 to determine whether a particular data word is in true or complement form. However, the embodiment of FIG. 1 utilizes the most significant bit in the Memory Address Register to make this determination, said bit being fed to the True-Complement bit register 24 (BO). Referring to FIG. 2, the upper data words are in true form and the lower data words are in complement form, (note the content of the most significant bit of the address). The data word is shown to have three additional fields. The first field, "Next Instruction Address," is conventionally used in such read-only storage memories to indicate the address of the next instruction in an instruction string and it is this address which will be gated to the Memory Address Register 10 either directly or in a modified form to obtain the next instruction data word. Additionally, the data word is shown to contain two instruction fields, $I_1$ and $I_2$. These could be fed for example to the two Instruction Decoders D1 and D2 which would decode the instruction and initiate appropriate system control functions as will be readily understood. It should be clearly appreciated that the present data form is shown by way of example only and that greater or fewer instruction fields could be utilized in a typical system or additional address generation means could be utilized to modify the content of the Next Instruction Address field.

Returning now to FIG. 1, assuming that a data word has been read out of the read-only store and it has been found to be error free, the address of the next instruction is extracted from the Memory Buffer Register 16 and routed through the gate G1 into the Memory Address Register 10 by the Control Unit 18. The setting of the Memory Address Register 10 and the initiation of the operation of the Address Decoder 12 and the appropriate memory drivers (not shown) is initiated by the Control Unit 18 in well known control sequences. Specific details of the memory controls and timing circuitry have not been shown as they are quite conventional. The only timing criteria added by the present invention are the additions of the interlock at G3 and the provision of sufficient time to allow the Checker 20 to evaluate the data and determine if it is correct or whether the Read-Only Store must be reaccessed at the complement address.

As stated previously, it is necessary that each data word in the read-only store contain a parity bit which preferably is the combination parity of the address of the word which appears in the Memory Address Register and the bit content of the word itself. As will be appreciated, such a parity will give a meaningful check of the addressing circuitry as well as the read-only store memory. Thus, if the Address Decoder and driving circuitry cause an incorrect word to be read out the probability of the parity of the word actually read out and the address in the Memory Address Register being incorrect is great. Alternatively, each data word could carry one parity bit which represents the parity of the data word itself and an additional bit which represents the parity of its address. However, this would require more hardware and would not contribute too greatly to the error free operation of the system. Accordingly, a single parity bit has been disclosed and described. Error detection checker 20 is the unit which receives the address currently in the Memory Address Register together with the data word accessed from the read-only store from the Memory Buffer Register 16, determines the parity of said combined elements and checks same against the parity bit in the data word. The occurrence or nonoccurrence of an error will be then passed on to the Control Unit 18. If there is no error, the unit may then enable the gate circuit G3 in order that said data may be transmitted through the system and thence the Instruction Decoders, etc. At the same time, Gate G1 is energized to pass the address of the next word in the instruction stream to the Memory Address Register 10 so that said word may be accessed. It will of course be understood that access of the next word will in all probability be conditioned upon receipt of an "operation completed" signal from the main computing system indicating that the previous instruction has been completed and that the system is not ready to receive the next instruction. Conversely, if the Error Detection Checker 20 indicates that an error has been detected, it will cause the control unit 18 to hold up its signal to the gate G3. It will cause the current contents of the Memory Address Register to be passed through the inverter 22 and the gate G2 and thence back into the Memory Address Register 10 in complement form. This complementary address is then utilized to initiate another read cycle in the Read-Only Store Memory and assumedly the data word in complement form will be accessed and placed in the Memory Buffer Register 16. Again the error detecting checker 20 examines the parity of this word together with its address obtained from the Memory Address Register and if the word is correct, as it assumedly will be, gate G3 is energized and the instruction fields are passed to the Instruction Decoders and the address of the next instruction is gated through G1 to the Memory Address Register 10.

As stated previously, the True-Complement Bit Register 24 will be set by the high order bit currently in the Memory Address Register 10 so that if a data word in complementary form is being currently accessed, the Instruction Decoders may be advised of this, as indicated. Conversely, the instruction word could be gated through an additional inverter (not shown) before it reaches the Instruction Decoders.

As will be apparent from the preceding explanation, the system may now continue to access sequences of instruction words utilizing the complementary addresses stored in the next instruction address field since the control system always examines the True-Complement bit and signals the external system accordingly.

The error detection and correction capability of the present system with respect to erroneous operation of the addressing circuitry was described previously and would normally be detectable only by a disagreement in parity between the address and the data word. However, this test would pick up a good percentage of errors occurring in this portion of the system. Error tolerance for errors occurring in the main memory matrix would be achieved in the following way. Suppose a failure occurs in a sense amplifier or a sense latch such that a particular bit always reads as a 0. This will not affect the operation of the system until a word is read from the memory matrix where that particular bit should be a 1. When this occurs, an error will be indicated due to a parity error indication from the checker 20 as described previously which will initiate a second read cycle and this time, the complementary word will be read out. It will be apparent that for that particular bit position of the complementary word, the bit that is actually read out from the memory will now correctly be a zero and even though the memory circuitry is malfunctioning the word read out into the Memory Buffer Register will be correct and the system may continue to operate in a normal fashion. Similarly, in the addressing mechanism, failures normally take the form of nonrecognition that a particular bit in the address is a 0 or a 1. When the address is complemented that particular difficulty is obviated and a correct word will be read out of the memory matrix.

Having thus completed the description of the present read-only store memory system and its operation, it may readily be seen that considerably improved reliability of a read-only store memory may be achieved utilizing the principles of the present invention. It will be apparent that intermittent failures will readily be circumvented and that many hard failures of the system may be tolerated before ultimate system shut down is required.

While a preferred embodiment of the invention is disclosed, it will be apparent that many modifications and changes could be made by persons skilled in the art without departing from the spirit and scope of the invention.

For example, different parity checks could be made and different true-complement controls could be utilized.

As an additional feature of the invention, controls could be provided so that when an error is detected in both the true and complement read-out operation for a particular word, the system will automatically be notified so that some alternative procedure may be followed.

While the invention has been particularly shown and described with reference to a preferred embodiment thereof, it will be understood by those skilled in the art that various other changes in form and details, in addition to those above, may be made therein without departing from the spirit and scope of the invention.

I claim:

1. A method of operating a read-only storage memory comprising the steps of generating a first address, storing a data word at said address, generating the complement of said first address, storing the same data word at said complement address, continuing said storage operations until all data words are stored in said memory, checking each address supplied to said memory and accessing the complementary address if an error in the address is detected.

2. A method of operating a read-only storage memory comprising the steps of generating a first address, storing a data word therein in true form at said first address, generating a second address, storing said same data words in complement form at said second address continuing said operations until all data words are stored in said memory, checking each data word read out of said memory and accessing said second address location when an error is detected.

3. A method of operating a read-only storage memory comprising the steps of generating a first address, storing a data word therein in true form at said first address, generating a second address by generating the complement of said first address, storing said same data words in complement form at said second address, continuing said operations until all desired data words are stored in said memory, checking each data word read out of said memory, and accessing said second address when an error is detected.

4. A method for operating a read-only store as set forth in claim 3 including the step of storing an error indication field with each word whereby the correct readout of said word may be ascertained.

5. A method of organizing a read-only store as set forth in claim 4 wherein said last named step includes the step of determining the parity of each data word together with its address location in the read-only store and storing such combined parity indication with said word in said read-only store.

6. In a read-only storage memory system including a memory address register, memory accessing circuitry, and a memory buffer register wherein said memory is organized such that each word in memory is stored twice, once in true and once in complement form the improvement which comprises:

means for checking the contents of the memory buffer register after read out of a word to determine if the word is correct based on an error detection field carried within the word, and means actuable in response to an incorrect determination to cause the complementary data word stored at a different address in the read-only store to be accessed.

7. A read-only store memory system as set forth in claim 6 wherein the data words in true and complement form are stored at addresses which are themselves complementary, and means for causing the complementary form of the data word currently being read out when an incorrect determination is made to cause the memory to access the complement of the address just accessed.

8. A read-only memory storage system as set forth in claim 7 including means for determining if a data word currently being accessed from memory is in true or complement form and means for signalling this fact to the memory control system.

9. In an error tolerant read-only storage memory system including a read-only storage memory, a memory address register, memory accessing circuitry, and a memory buffer register, the data being stored in said memory in true and complement form, the address of the complement form of any given data word being itself the complement of the address of the true form of said data word, the improvement which comprises:

control means for accessing said memory at a location specified by the contents of said memory address register, error detection means operative in response to said control means for checking the combined content of the memory address register and the memory buffer register subsequent to any data read out operation, said control means including further means to gate the contents of the memory buffer register to the output of said system when it has been determined that "no error" exists, and means in said control means for causing the current content of the memory address register to be complemented and gated back into said memory address register, means operative in response to said last means to cause the read-only storage memory to be accessed at said complement address means for examining a specified address field of said memory address register subsequent to each readout operation to determine if a current data word being accessed from the read-only storage memory is in true or complement for, and means for continuing said cycle of operation until a given data readout sequence in said read-only storage memory is completed.